United States Patent [19]

Voegle

[11] 4,263,251

[45] Apr. 21, 1981

[54] METHOD AND APPARATUS FOR PRODUCING ONE-PIECE CAPSULES

[75] Inventor: Guenther Voegle, Schoenaich, Fed. Rep. of Germany

[73] Assignee: Robert Bosch GmbH, Stuttgart, Fed. Rep. of Germany

[21] Appl. No.: 126,939

[22] Filed: Mar. 3, 1980

[30] Foreign Application Priority Data

Sep. 3, 1979 [DE] Fed. Rep. of Germany ....... 2909230

[51] Int. Cl.[3] .............................................. B29C 5/06

[52] U.S. Cl. .................................. 264/503; 264/523; 264/524; 264/571

[58] Field of Search ............... 264/503, 523, 524, 525, 264/540, 526, 571; 53/266, 264

*Primary Examiner*—Donald E. Czaja

*Assistant Examiner*—W. Thompson

*Attorney, Agent, or Firm*—Edwin E. Greigg

[57] ABSTRACT

A method and apparatus is proposed for producing one-piece hard gelatin capsules, intended in particular for the reception of liquid medicines. The formation of the capsules takes place according to the method by means of the uniform distribution of a predetermined quantity of gelatin or of another formable substance which is susceptible to use in the packaging of medicines, on the inner jacket surface of a closed form. An apparatus suitable for the performance of this method is revealed in the claims.

10 Claims, 5 Drawing Figures

METHOD AND APPARATUS FOR PRODUCING ONE-PIECE CAPSULES

BACKGROUND OF THE INVENTION

Hard gelatin capsules are used in great numbers for the packaging of pulverized, granulated or pelletized medicines. Such capsules are typically made in two halves which can be joined together, that is, a lower capsule portion and an upper capsule portion. The benefits provided by this form of packaging medicines are two fold, first, the production of the hard gelatin capsules can be done in an economical manner and, second, very precise dosing of the medicine to be packaged is possible. Other advantages provided are the possibility of filling a hard gelatin capsule with substances of various types; and that the production of the hard gelatin capsules, and the filling and sealing of the same, can be performed in different manufacturing locations. The medicine packager orders the two-piece hard gelatin capsules from specialized production firms, and the capsules are then processed by the packager on machines designed for filling and sealing hard gelatin capsules. In contrast, a completely different methodology has been previously used in the packaging of liquid medicines. In order to capsulate liquid medicines, soft gelatin capsules were preferably used, so that the fluid was filled in the capsule in the same single processing operation as that in which the capsules were produced (as described, for instance, in the British Pat. No. 564,538). Thus, to package liquid medicines, the medicine producer had only two alternatives, either procurement of expensive machines of this kind for production of soft gelatin capsules himself at his manufacturing plant—with all of the attendant problems involved in the manufacture of gelatin capsules—or contracting out the packaging of liquid medicines to places of business specially set up for filling gelatin capsules.

A challenge was thus created within the pharmiceutical industry to develope new technology which would improve upon the method then available for filling liquid medicines in hard gelatin capsules. Besides the elimination of the difficulties described above, such a novel method would provide the further advantage that the machinery previously used for filling these capsules with powders, or other solids, could also be put to use for filling liquid medicines into hard gelatin capsules. A method and an apparatus for filling liquid medicines into hollow containers, which were either prefabricated or created by the joining together of two halves of hard gelatin capsules, has been disclosed in the German Offenlegunschrift No. 26 50 649. In this known method, the filling of a two-piece hard gelatin capsule, which is sealed at the juncture between the two capsule halves is accomplished according to the injection principle. It has been demonstrated that this mode of operation enables the attainment of very good results in the filling of liquid medicines into hard gelatin capsules. Inspite of this advance, the sealing of the two-piece hard gelatin capsule remains a problem. In order to alleviate this seal problem and attain optimal results in the filling of liquid medicines into hard gelatin capsules, it is extremely desirable to develop a one-piece capsule which could be produced by simple means.

OBJECT AND SUMMARY OF THE INVENTION

The method according to this invention, possessing the characteristics of claim 1, has the advantage over the prior art, besides a relatively simple and reliable mode of operation, of producing a completely and tightly sealed hard gelatin capsules for the packaging of liquid medicines is disclosed. Furthermore, the particular modes of producing the one-piece capsule, as further described in claims 2–5, results in the further advantage of very economical production. In this novel method, no gelatin at all is wasted, because in producing each capsule only so much gelatin is withdrawn or supplied to the form as is required for producing one capsule. Beyond these advantages, there is the further advantage that, as a result of the manner of drying during production of the one-piece capsules, that is, the alternative introduction of warm air and the generation of a vacuum inside each capsule, an efficient drying process is performed which is substantially more effective than the drying method used in present-day production of hard gelatin capsule halves.

As a result of the claims directed to apparatus for performing the method according to the invention, an economical and rapid production advantageously results for one-piece hard gelatin capsules with precise outer dimensions. An appropriate embodiment of the form permits the production of different outer contours, for instance, one-piece capsules can be made whose outer form corresponds to the presently used two-piece capsules. This feature produces the advantage that these one-piece capsules can be processed on known machines which are already in use; that is, they can be processed by the same method by which the known two-piece hard gelatin capsules are processed. There is also the possibility of making the head and base portion of the capsule different from one another by means of appropriately embodying the form or mold. By forming a spherical depression in the head portion of the one-piece hard gelatin capsule, the fill opening can be appropriately sealed after the filling procedure, for instance, by a drop of gelatin or the like; thus, the sealing compound is prevented from running out.

By means of the features disclosed in the further dependent claims, advantageous further embodiments of and improvements to the features disclosed in the foregoing claims are possible.

The invention will be better understood as well as further objects and advantages thereof become more apparent from the ensuing detailed description of the preferred embodiments taken in conjunction with the drawings.

BRIEF DESCRIPTION OF THE DRAWINGS

FIG. 5 is an overall view of an apparatus for producing one-piece gelatin capsules or the like.

DESCRIPTION OF THE PREFERRED EMBODIMENTS

Figures 1A, 1B, 1C, 1D, 1E, 1F, 1G:
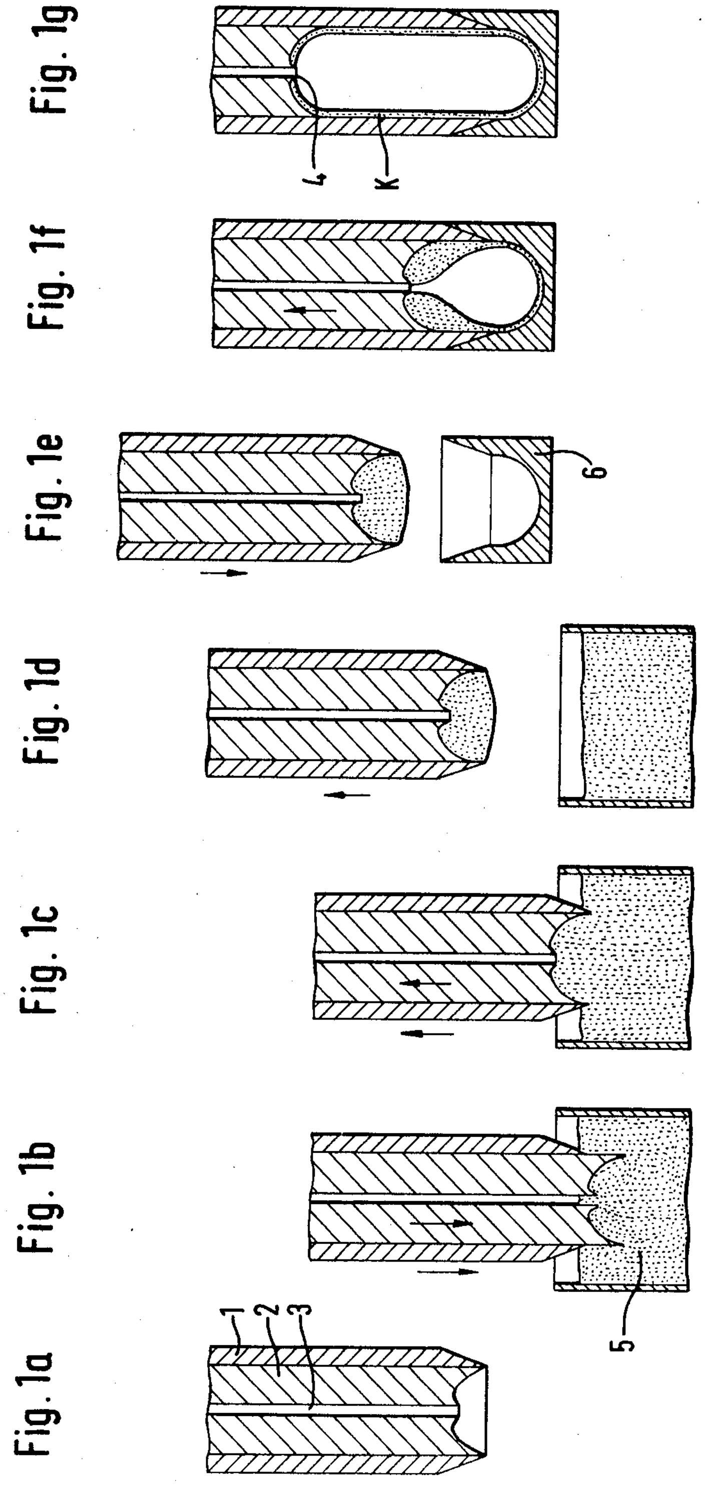
FIG. 1 shows the production of a one-piece hard gelatin capsule with the aid of a form or mold which can be dipped into a gelatin container.
Figure 2H:
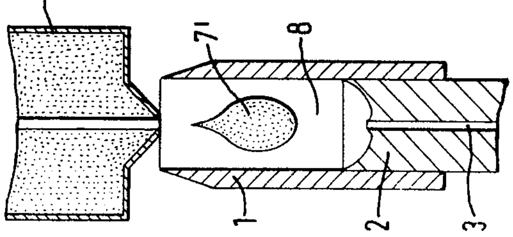
FIG. 2 shows the production of a one-piece hard gelatin capsule with a form rotated by 180° relative to FIG. 1 and to which a drop of gelatin is supplied.
Figure 2I:
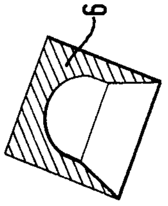
Figure 2K:
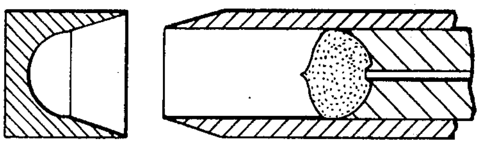
Figure 2L:
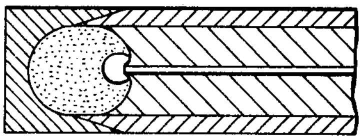
Figure 2M:
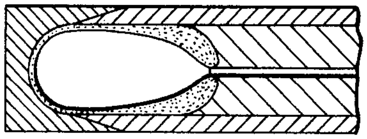
Figure 2N:
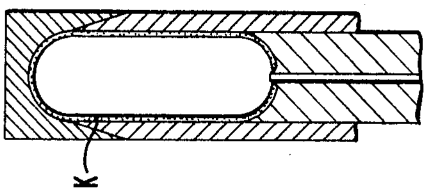

The form or mold shown in FIG. 1 substantially comprises an outer cylinder 1, within which a piston 2 is guided. This piston 2 has a lengthwise bore 3 which communicates with a compressed air or vacuum generator, not shown. The forward area of the piston 2 is so embodied that a spherical depression 4 results in the head portion of the finished capsule. This spherical depression serves to receive a drop of gelatin for the purpose of the later sealing of the fill opening of the capsule after the filling process. Beginning with the position of the cylinder 1 and the piston 2 shown at a in FIG. 1, the cylinder and piston, as shown at b, are dipped into a gelatin container 5. During this operation, the piston 2 is moved further downward. Subsequently, the bore 3 is put into communication with a vacuum generator, not shown, so that gelatin is taken up by suction. Then, as shown at c, the piston is moved upward inside the cylinder 1, the vacuum being maintained. After the cylinder 1 and the piston 2 have been moved together out of the gelatin container 5 (d), a form base 6 is made ready as shown at e. By fitting the cylinder 1 together with the form base 6, a closed form or mold results as shown at f. Now, still at f, the bore 3 of the piston 2 is placed in communication with the compressed air source, so that during the simultaneous upward movement of the piston 2 and the supply of compressed air, the capsule is formed on the inner jacket surface embodied by the cylinder 1, the forward area of the piston 2 and the form base 6, with the gelatin being uniformally distributed on this surface, as shown at g. In order to produce such one-piece hard gelatin capsules economically, the arrangement is so efficiently designed that a multiplicity of the forms comprising the cylinder 1 and piston 2 as well as the form base 6 are provided, which in common perform the movement the course of which is shown in FIG. 1, a through g.

The production of one-piece hard gelatin capsules according to FIG. 2 (h -n) is accomplished in the same manner as has been described in connection with FIG. 1. The difference is only that the form comprised of cylinder 1, piston 2 and base 6 has been rotated by 180° relative to the form shown in FIG. 1. As a result of this feature, the dipping of the form into a gelatin bath is eliminated; instead, a drop of gelatin is introduced into the hollow chamber 8 formed by the cylinder 1 and the retracted piston 2 with the aid of a gelatin feeding device 7 (h). After the pivoting into position of the form base 6 in the downward movement of the cylinder 1 together with the piston 2 (i, k), the cylinder 1 is brought together with the form base 6, and simultaneously the piston 2 is moved upward again (1). Simultaneously (still at 1) the supply of compressed air begins via the bore 3, whereupon the piston 2 is moved upward again (m). In this operation, the gelatin is distributed uniformly on the inner jacket surface of the form, as has already been described for FIG. 1, so that a one-piece hard gelatin capsule is produced. Subsequently, the hard gelatin capsule K is exposed via the bore 3 alternatively to a vacuum and to warm air for the purpose of the drying thereof.

Figures 3O, 3P, 3Q, 3R, 3S, 3T:
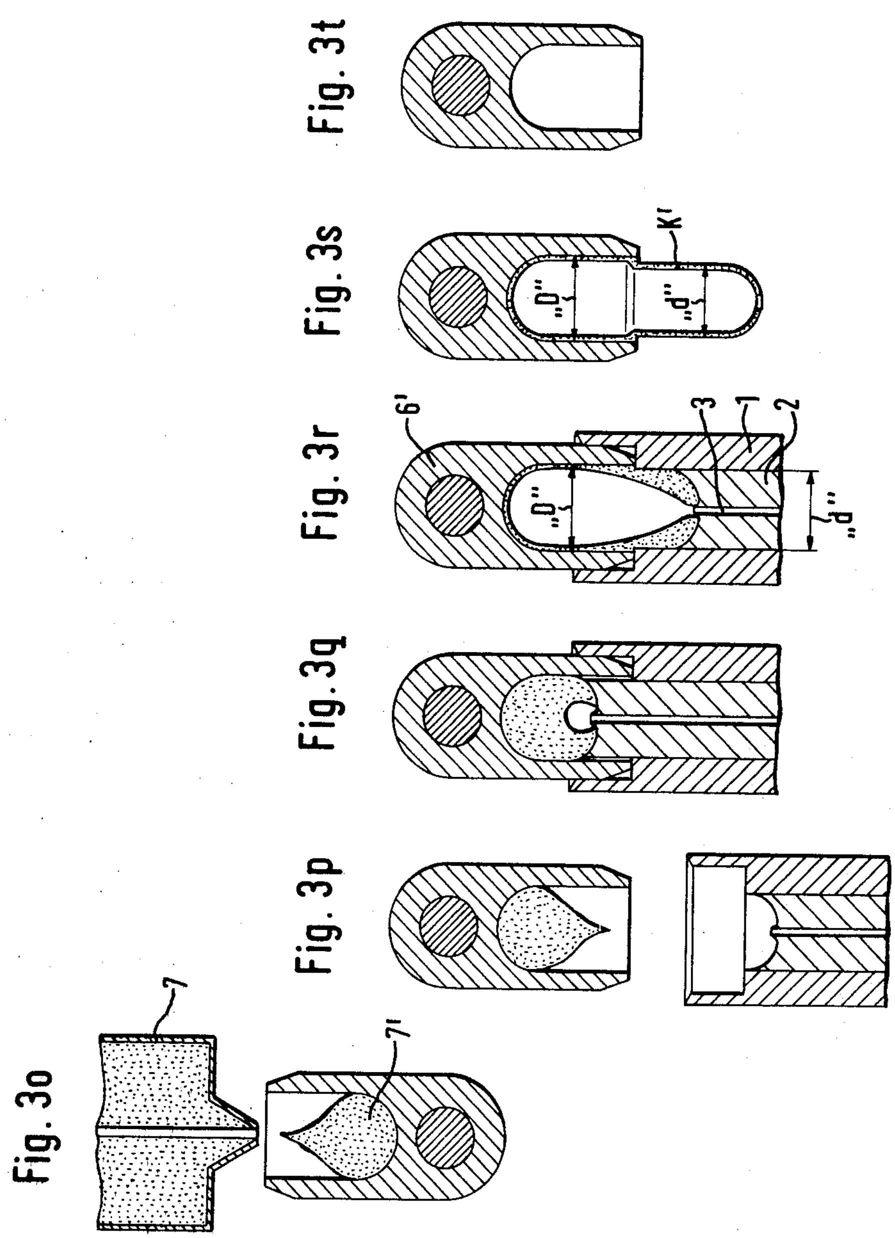
FIG. 3 shows the production of a one-piece hard gelatine capsule with an outer contour adapted to the known two-piece capsules, using a pivotable form base for receiving a drop of gelatin.

The mode of operation illustrated by FIG. 3 (o–t) substantially corresponds to the mode of production according to FIG. 2. The difference is solely that the form is embodied so as to produce a one-hard piece hard gelatin capsule K′ which has two different diameters ("D" and "d"). The inner diameter of the cylinder 1 is therefore smaller then the inner diameter of the form base 6′. A further difference is that in this embodiment the form base 6′ is embodied as being pivotable in such a manner that it can receive the drop of gelatin 7′ fed by the gelatin feeding device 7 (o). Subsequently, the form base 6′ is rotated by 180° (o). The further course of production of a one-piece hard gelatin capsule then corresponds to that described in connection with FIG. 2. In this case, the hard gelatin capsule K′ can be dried as indicated at s, after the cylinder 1 and piston 2 have been moved downward, so that rapid drying of the hard gelatin capsule K′ is the result. At t, the empty form base 6′ is shown after the drying process of the hard gelatin capsule K′ has been completed.

Figures 4U, 4V, 4W, 4X, 4Y:
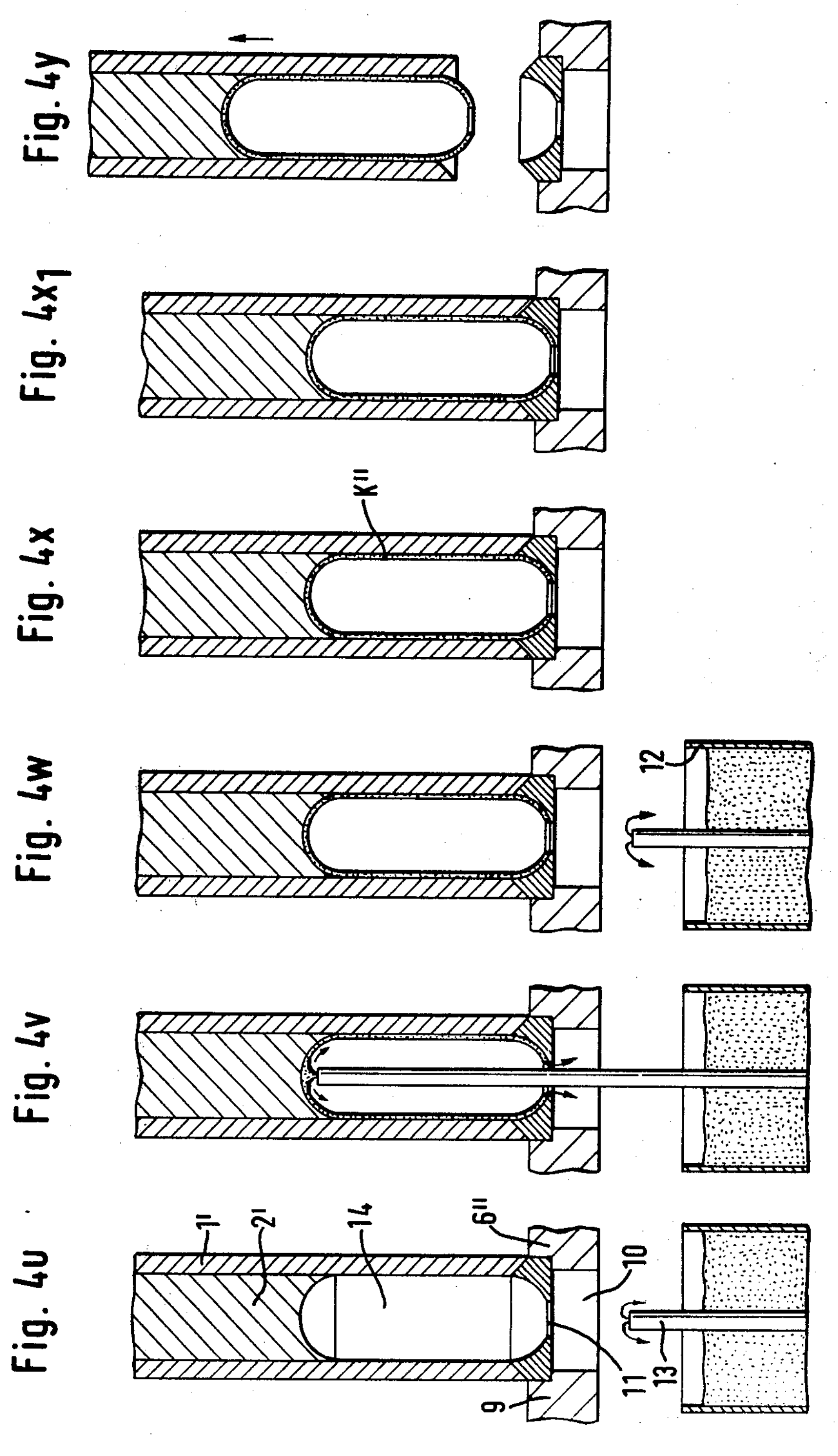
FIG. 4 shows a further possibility of producing one-piece hard gelatin capsules with the aid of a closed form.

FIG. 4 (u–y) shows a manner of producing one-piece hard gelatin capsules which is different from that of FIGS. 1–3. In this case, the form also comprises a cylinder 1′, a piston 2′ guided in the cylinder 1′ and a form base 6″. The form base 6″ is secured in a platform 9. This platform 9 has an aperture 10 and the form base 6″ is provided with an opening 11. Needles 13 are disposed inside a gelatin container 12 and arranged to be movable up and down therein and can be introduced into the hollow chamber 14 defined by the cylinder 1′, the piston 2′ and the form base 6″ (u). These needles 13 serve the purpose of the injection of gelatin or the like into the hollow chamber 14. As shown at v the particular needle 13 is thereupon introduced far enough into the hollow chamber 14 so that the injected gelatin, beginning at the head portion of the hollow portion 14, is distributed downward over the inner jacket surface of the form. The excess gelatin then escapes at the bottom and flows back into the gelatin container 12. The gelatin is pumped continuously through the needle 13 so that even when the needle 13 is not introduced into the hollow chamber 14, the gelatin still flows through it and there is continuous circulation of gelatin. Subsequently, the hard gelatin capsule K″ thus formed is dried as shown at x by alternatively exposing it to a vacuum and to warm air. The opening of the form by means of moving the cylinder 1′ and the piston 2′ upward is shown at y. Subsequently, the hard gelatin capsule K″ can be expelled by means of moving the piston 2′ downward inside the cylinder 1′.

Figure 5:
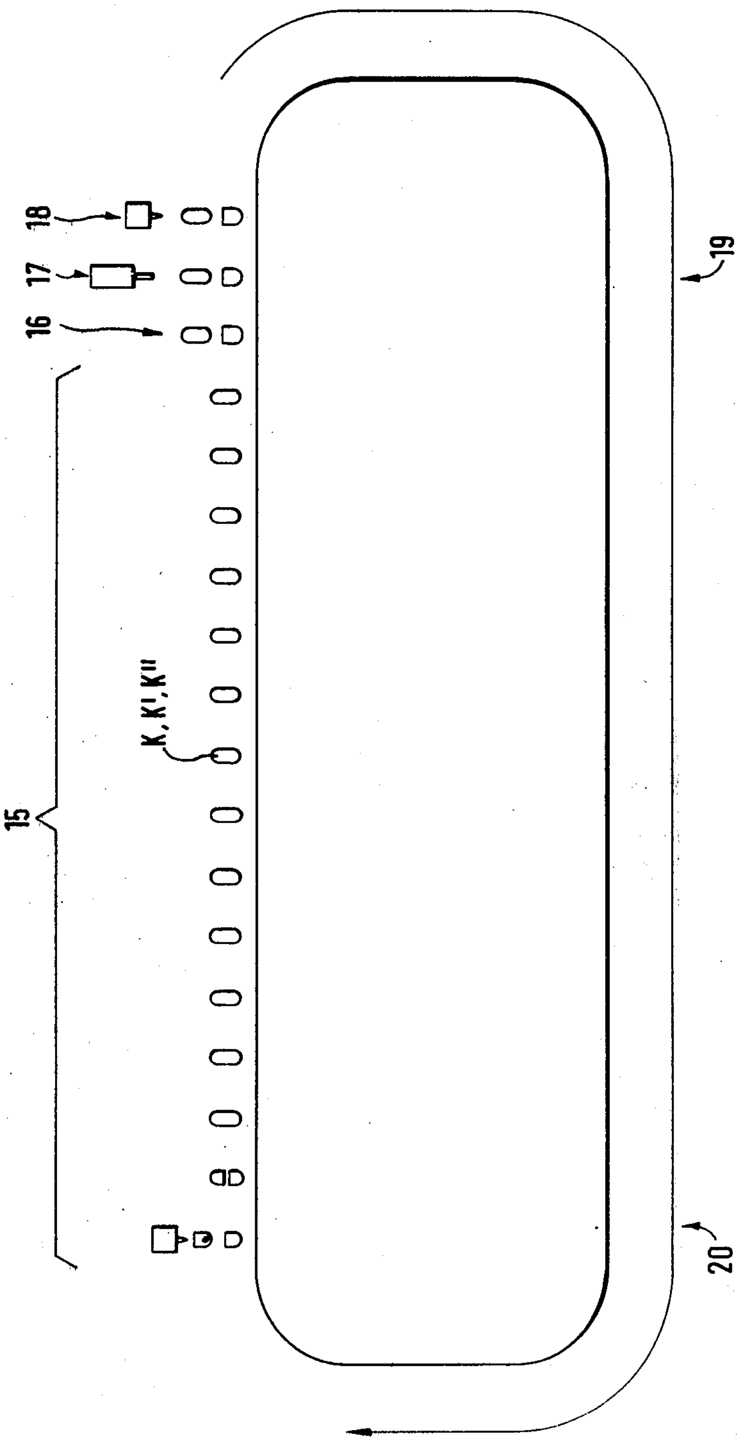

FIG. 5 shows in schematic form how the individual work stations can be arranged for producing one-piece hard gelatin capsules. The possibility is simultaneously afforded of performing the filling and sealing of the fill opening of the hard gelatin capsules directly after the drying of the one-piece hard gelatin capsules. The sealing station could then, as indicated schematically, be immediately followed by an area intended for the completed drying of the capsules and of the sealing drop, which is generally of gelatin. With an embodiment and arrangement of this kind, a relatively compact system would result for the production, filling and sealing of one-hard gelatin capsules.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A method for producing one-piece gelatin capsules, comprising the steps of positioning a mechanism containing a supply of gelatin in axial alignment with the capsule forming means provided with a perforated piston at a cylinder having an inner wall and a terminus;

introducing a portion of said supply of gelatin to said capsule forming means;

aligning a base element in contacting and sealing relationship with said capsule forming means and drawing said piston through said cylinder while applying compressed air to said gelatin through said perforated piston, whereby the capsule is formed on said inner wall of said cylinder.

2. A method for producing one-piece gelatin capsules as claimed in claim 1 comprising the further steps of drying said capsule while positioned in said cylinder and thereafter expelling the capsule from said cylinder.

3. A method for producing one-piece gelatin capsules as claimed in claim 1 comprising further steps of moving the piston away from the terminus of said cylinder;

introducing a droplet of gelatin into a zone formed between said piston and said inner wall of said cylinder;

aligning said base element with said cylinder and applying pressure to said gelatin droplet to cause it to contact said base element and drilling said piston through said cylinder while continuing to apply pressure to said gelatin.

4. A method for producing one-piece gelatin capsules as claimed in claim 1 the step of rotating said piston, cylinder and said base element as a unit so that the capsule is shaped to the contour of said piston, cylinder and base element.

5. A method for producing one-piece gelatin capsules comprising the steps of positioning a mechanism containing a supply of gelatin in axial alignment with the capsule forming means;

advancing a cylinder provided with a piston and an inner wall into contact with an aperture platform provided with a perforated base element;

moving a needle element upwardly through said base element into close proximity with said piston;

ejecting gelatin through said needle against said piston so that the gelatin flows down in a wall of said cylinder and returns to a source of supply;

withdrawing said needle from said cylinder;

drying said capsule;

moving the cylinder away from said base element and ejecting the capsule from said cylinder.

6. A method for producing one-piece gelatin capsules comprising the further step of connecting the perforation in said piston to a compressed air source.

7. A method for producing one-piece gelatin capsules as claimed in claim 1 comprising the further step of connecting the perforation in said piston to a vacuum generator.

8. A method for producing one-piece gelatin capsules comprising the steps of connecting the perforation in said piston to a warm air generator.

9. A method for producing one-piece gelatin capsules the further steps of advancing said perforated piston into the supply of gelatin and withdrawing a predetermined portion of gelatin therefrom.

10. A method for producing one-piece gelatin capsules as claimed in claim 1 comprising the further steps of depositing a droplet of gelatin in said base element and rotating said base element 180 degrees to align the same with said capsule forming means.

* * * * *

UNITED STATES PATENT AND TRADEMARK OFFICE

CERTIFICATE OF CORRECTION

PATENT NO. : 4,263,251

DATED : April 21, 1981

INVENTOR(S) : Guenther Voegele

It is certified that error appears in the above—identified patent and that said Letters Patent is hereby corrected as shown below:

Page 1, before the ABSTRACT, change priority date from "September 3, 1979" to -- March 9, 1979 --.

Signed and Sealed this

*Twenty-seventh* Day of *October 1981*

[SEAL]

*Attest:*

GERALD J. MOSSINGHOFF

*Attesting Officer* *Commissioner of Patents and Trademarks*